Sept. 10, 1940.     F. B. BRISTOL     2,214,159
IMPULSE TRANSMITTER FOR TELEMETERING SYSTEMS
Filed April 6, 1939
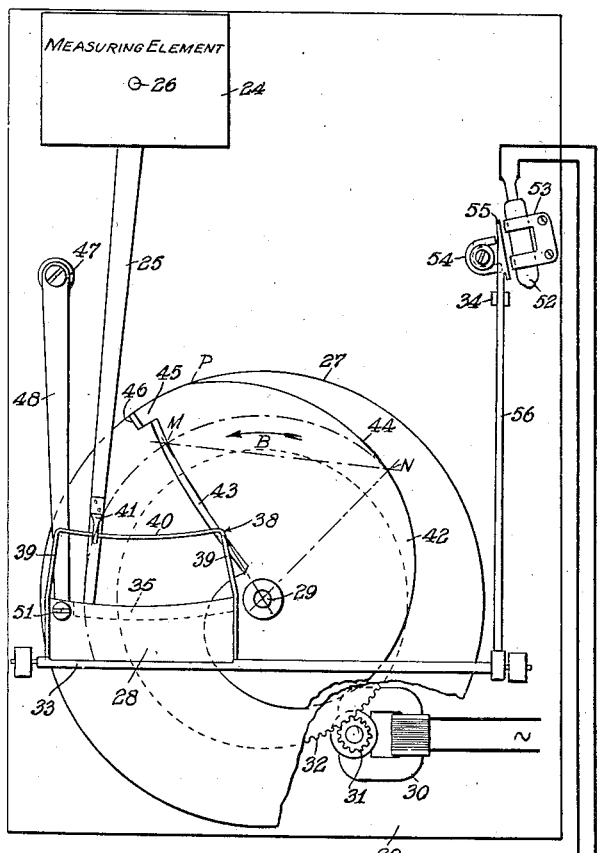
Fig.1.
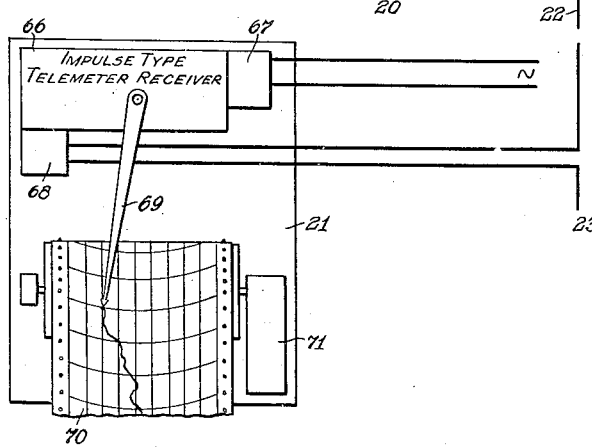
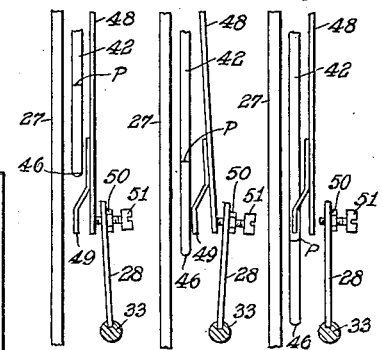
Fig.2.  Fig.3.  Fig.4.
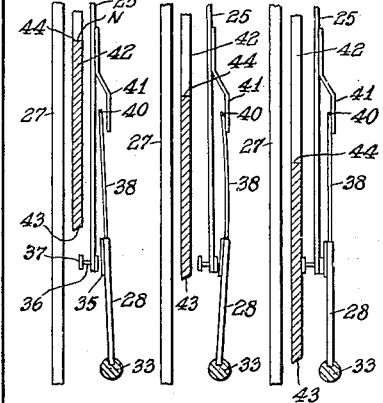
Fig.5.  Fig.6.  Fig.7.
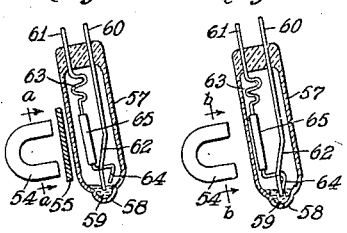
Fig.8.  Fig.9.
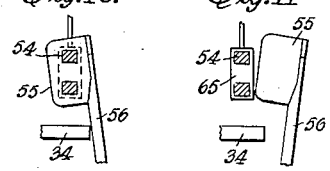
Fig.10.  Fig.11.
INVENTOR.
FRANKLIN B. BRISTOL
BY
ATTORNEY.

Patented Sept. 10, 1940

2,214,159

UNITED STATES PATENT OFFICE 2,214,159

IMPULSE TRANSMITTER FOR TELEMETERING SYSTEMS

Franklin B. Bristol, Middlebury, Conn., assignor to The Bristol Company, Waterbury, Conn., a corporation of Connecticut Application April 6, 1939, Serial No. 266,299

9 Claims. (Cl. 200—56)

This invention relates to telemetering systems, and the like, of the class wherein signals of time durations corresponding to successive values of a variable are transmitted as cyclically recurrent electrical impulses of equal magnitude but varying durations, and translated into scalar magnitudes representative of said values by means of a receiver device comprising substantially constant speed motor means and means actuated thereby for the duration of each of said signals. Such a system is fully set forth in U. S. Letters Patent No. 1,822,683 issued to K. Wilde September 8, 1931, and subsequently reissued as No. 19,039, January 2, 1934. The present invention relates more especially to a transmitting instrument for a telemetering system of this class, and is particularly suited for use in conjunction with a receiving instrument of the form set forth in U. S. Letters Patent No. 2,040,918 issued to C. W. Bristol May 19, 1936. It is well known to those versed in the art that a transmitter for this class of measurement may take any one of several more or less distinct forms. A preferred form of such device, to which the principles of the invention are particularly applicable, is one wherein a pointer-arm is caused to excurse, to an amount representative of a magnitude to be measured, across the face of a constantly rotating flat scroll plate having a spiral trailing edge, the pointer arm being adapted to be engaged periodically by the plate for time intervals dependent upon the excursion of the said arm and thus actuating electrical circuit-controlling means governing signals in a transmitting circuit. The pointer-arm to this end carries a rider which is lifted by the leading edge of the scroll-plate and rests upon the same, maintaining the circuit-controlling means in a definite position until the spiral trailing edge of the scroll-plate passes beneath the rider, when the latter is dropped and the circuit-controlling means released.

In certain forms of transmitters of this class, especially those in which the directive forces acting on the measuring element are relatively weak, sometimes requiring the use of delicately jeweled bearings, the shock to the element attendant upon the striking of the rider by the leading edge of the scroll-plate in its rotation, and the side-thrust due to drag of the scroll-plate while the rider is in engagement with the same, are productive of undesirable effects on the mechanism, tending to destroy accuracy, damage delicate parts, and promote premature wear.

It is an object of this invention to provide means whereby in transmitting instruments of this class, the measuring element shall be relieved of shock due to sudden engagement by the rotating element.

It is a further object of the invention to provide means whereby the movable part of the measuring element shall be clamped from displacement and also prevented from exerting side thrusts on its bearings, during the time of its engagement with the rotating element.

It is a further object of the invention to provide in a transmitting instrument of this class a circuit-controlling means which shall be quick in operation, relatively free from inertia, and shall impose a negligible mechanical burden upon the actuating mechanism.

In carrying out the invention, there is provided an additional rider which is not associated with the pointer arm of the measuring device, but is designed to be periodically engaged by a part of the scroll-plate to cause the pointer rider to be elevated to the surface of the said plate coincidentally with the establishment of the recurring cycles. The additional rider is subsequently released so that the pointer may function in the manner hereinbefore set forth through its rider being disengaged from the scroll-plate at an instant determined by the contour of the trailing edge of the latter.

The nature of the invention, however, will best be understood when described in connection with the accompanying drawing, in which:

Fig. 1 is a diagrammatic representation of a telemetering system embodying the invention.

Figs. 2, 3, and 4 illustrate, on an enlarged scale, certain elements of the mechanism in three positions corresponding to three conditions in the cycle of operation.

Figs. 5, 6, and 7 illustrate, on an enlarged scale and partially in section, certain other elements of the mechanism in positions corresponding respectively to those of the elements shown in Figs. 2, 3, and 4, a portion represented by the line M—N in Fig. 1 being shown in section.

Figs. 8 and 9 show, partially in section, a circuit-controlling element embodied in the invention and in two positions corresponding to different conditions in the normal cycle of operation.

Figs. 10 and 11 are fragmentary sectional views of parts of the mechanism shown in Figs. 3 and 9, in positions corresponding to said figures, respectively, and taken on the lines a—a and b—b, respectively, looking in the direction of the arrows.

Referring to the drawings, Fig. 1 shows a telemetering system including a transmitting instrument 20 and a receiving instrument 21, the same being interconnected by a two-conductor electric circuit 22 adapted to receive energy from a power source 23 which may be located in proximity to either instrument or elsewhere in the circuit, as may be expedient. Mounted in the instrument 20, and forming an essential part thereof, is a measuring element 24 having an extended arm 25 adapted to excurse in a plane through a limited angle about a spindle or axis 26 to an extent representative of the magnitude of a variable quantity to be measured, which quantity may, for example, be electrical or thermal units or units of fluid flow or any other variable subject to scalar representation and measurement. The arm 25 is made substantially rigid in its plane of excursion and slightly resilient in a sense perpendicular to said plane.

The plane of excursion of the arm 25 lies between a flat circular plate 27 to the rear and a flat rocker-plate 28 to the front, the path of the extremity of the arm being substantially radial to the circular plate 27. The said plate 27 is carried upon a centrally disposed shaft 29, and is continually rotated at a uniform velocity in a counter-clockwise sense (as shown by the arrow B) by means of a constant-speed motor 30 acting through gears 31 and 32 to give the plate 27 an angular velocity of, for example, about four revolutions per minute.

The rocker-plate 28 is carried by an oscillatable shaft 33 to which it is fixed, and is free to swing through a small angle transversely of the plane of operation of the arm 25, and in its position toward the plate 27 rests upon a stationary stop 34. The edge of the plate 28 toward the axis 26 is curved to an arc substantially concentric about said axis, and there is cemented, or otherwise secured, to the inner surface of the plate immediately below the edge, a pad 35 consisting of a sector of smooth friction material, such as prepared cork.

Carried upon the extremity of arm 25 is a rider 36 (see Figs. 5, 6, and 7) in the form of a stud having preferably a hardened and polished surface 37 toward the plate 27, and projecting slightly forward toward the pad 35 on the rear surface of the rocker-plate 28. Normally, the rider 36 swings freely with the arm 25 in the space provided between the plates 27 and 28.

Secured to, and movable with, the rocker-plate 28 is a bow 38 formed of light spring wire, having end portions 39 projecting away from the shaft 33, and a bridge portion 40 curved to an arc substantially concentric about the axis 26 and normally lying in a plane parallel to, and slightly to the front of, the plane of excursion of the arm 25. Fixed upon the arm 25 is a hook 41 embracing the arcuate portion 40 of the bow 38, and so disposed that as the arm 25 moves to various points in its measuring range, the said arcuate portion at all times lies within the said hook and is normally out of contact therewith.

Carried upon, and rotating with, the shaft 29, and having a slight axial spacing from the plate 27 is a flat smooth scroll-plate 42 having a leading edge 43 and a spiral trailing edge 44. The leading edge is conformed to an arc of substantially the same radius as that of the curved edge of the rocker-plate 28, and so positioned on the scroll-plate as to be concentric with the axis 26 as the edge 43 passes beneath said rocker-plate.

For reasons hereinafter to be set forth, the edge 43 is given a slight bevel outwardly. The radial extremity of the said leading edge of the scroll-plate is modified to the form of a tangentially projecting portion 45 having a radially short and abrupt edge portion 46 disposed to progress slightly in advance of the edge 43 in the counter-clockwise rotation of the scroll-plate.

Mounted upon a support 47 carried by the frame of the instrument 20 is an extended arm 48 lying substantially in the same plane as arm 25, but not intersecting the same, and slightly resilient in a sense perpendicular to said plane. The free extremity of arm 48 lies in the space between the plates 27 and 28, near the circumference of the former, and carries a rider 49 having an inclined face adapted to be engaged by the edge 46 and thereby deflected through a small angle in a sense perpendicular to the plane of rotation of the scroll-plate. Threaded through the plate 28, and adjustably locked thereto by a nut 50 is a screw 51, adapted to engage the extremity of the arm 48, whereby upon deflection of the arm by the rider 49 engaging the edge 46, the plate 28 will be deflected in a similar sense.

The circuit-controlling device, by means of which impulses of electrical energy in the circuit 22 are made subject to the transmitting instrument, may advantageously taken the form of a magnetically actuated mercury switch of the type set forth and described in U. S. Letters Patent No. 2,085,316, issued to K. Junicker June 29, 1937. Such a switch is indicated at 52 in Fig. 1, being mounted on the frame of the instrument 20 by means of a clip 53, and lying within the field of a small permanent magnet 54 also fixed to the frame of the instrument. Actuation of the switch is controlled by means of a vane 55 of ferromagnetic material, carried upon the extremity of an arm 56 fixed to the transverse shaft 33, so that upon angular deflection of the shaft in response to movements of the plate 28 the vane 55 is either withdrawn from the field of the magnet, allowing the same to influence the switch 52, or, interposed between the magnet poles and the switch, shunting sufficient of the flux to release the switch, according to the position of the plate 28. The magnetic reaction of the flux of magnet 54 upon the vane 55 exerts a definite pull on the latter, tending at all times to move the vane into the field of the magnet, thereby opposing the outwardly-exerted force derived from the rocker-plate 28 and thus providing a definite snap action of the switch without the need for springs or the like.

The action of the circuit-controlling device will be better understood by reference to Figs. 8 and 9, which are vertical sectional views of the switch, shown in its open-circuit and closed-circuit positions, respectively. The body of the switch is a cylindrical envelope or tube 57 of glass or the like closed at its lower end preferably to form a slight depending pocket or cup 58 adapted to receive and retain a small body of mercury or other liquid conductor 59. The upper end is sealed to embrace two leading-in wires 60 and 61, which also serve as mountings for the internal electrodes. One electrode 62, forming an extension of the wire 60, is in the form of a rigid wire engaging permanently the mercury 59 in terminating below the surface thereof. The other electrode includes a resilient part 63 and an angular-shaped stiff portion 64, maintained by the resiliency of part 63 with its tip normally out of contact with the surface of the mercury.

Carried by the portion 64 is a small armature 65 of ferromagnetic material adapted to respond to the influence of a magnetic field in such a manner that, when the field is present in sufficient intensity and of suitable direction, the armature will be attracted toward the magnet side of the enclosing tube, causing the tip of the electrode portion 64 to dip into the mercury and thus establish electrical connection between the wires 60 and 61. When the field is removed or materially weakened, the armature will be released to allow the tip of portion 64 to be deflected to its normal position out of contact with the mercury, opening the circuit between said leading-in wires. A structure of this nature, having sealed therein a suitable inert gas, has been found to provide a switch of great reliability, and to be capable of positive operation with a very small expenditure of mechanical force. While the maximum carrying capacity of switches of this type is normally obtained with the body in a substantially vertical position, it has been found that for the purposes of precise determination of impulse timing in an electrical circuit, where load conditions are not severe, a better operation is obtained with the body slightly sloped as shown in the drawing.

While it has been customary to actuate switches of this type by the moving of a small magnet in relation to the tube, it has been found that more precise operation is obtained by maintaining the magnet stationary with relation to the tube and providing means for diverting its flux as required. The magnet 54 is definitely fixed relatively to the tube 57 of the switch, and in such a position that its field will normally attract the armature 65 to deflect the electrode 64 into contact with the mercury pool 59, and closing the electrical circuit as shown in Fig. 9. In Fig. 10 is shown the same assembly, with the ferromagnetic vane 55 interposed between the magnet and the tube of the switch. The action of this vane, as is well understood, is to shunt or divert a large portion of the flux of the magnet away from the armature 65, releasing the movable electrode of the switch and allowing the same to assume its open-circuit position. Thus, it will be seen that, according to whether the vane 55 assumes the position shown in Fig. 10, corresponding to the un-deflected position of the plate 28, or the position shown in Fig. 11, corresponding to the deflected position of said plate, the circuit of the switch 52 will be either opened or closed, as shown in Figs. 8 and 9, respectively. Not only is the precision of operation increased by substituting, for the movable magnet generally utilized, a movable ferromagnetic shunt in conjunction with a stationary magnet; but the fact that the desired action may be obtained by the use of a vane whose mass need be but a small fraction of that of the magnet results in a material reduction in the inertia of the whole moving element.

The receiving instrument 21, shown in Fig. 1, takes the form of a receiving mechanism 66 of the class fully set forth and described in the above-mentioned Patent No. 2,040,918, having a constant-speed motor 67, an actuating magnet 68, and a recording pen 69, adapted to trace on a chart 70 driven by a clock mechanism 71 a continuous graphic record of all positions assumed by the pen 69 of the receiver mechanism. The interconnecting circuit 22 serves to energize the magnet 68 from the source 23 through the switch 52, thus providing operative relationship between the transmitting instrument 20 and the receiving instrument 21, so that the pen 69 will at all times tend to assume positions representative of those of the arm 25, all of which is well understood by those versed in the art, and for which no invention is herein claimed.

Following is a typical cycle of operation carried out by the transmitting instrument during a single revolution of the scroll-plate: Assuming first that the scroll-plate 42 is in a position substantially as indicated in Fig. 1, the plate 28 will be held by the pull of the magnet 54 on the vane 55 in its position of closest approach to the plate 27, as indicated in Figs. 2 and 5. In this position the arm 56 will rest against the stop 34, and the wire bow 38 will rest within, but out of contact with, the hook portion 41 carried by the arm 25, so that the latter will be free to move in response to variations in the measured magnitude and to assume positions representative of its values. At the same time, the vane 55 will occupy its corresponding position, as shown in Fig. 10, being interposed between the magnet 54 and the armature 65, whereby, as hereinbefore set forth, the switch 52 will stand with its contacts opened.

As the scroll-plate continues its counterclockwise rotation, moving downward as seen in Figs. 2 to 7, inclusive, the arcuate leading edge 43 will approach the rider or stud 36 carried by the extremity of the arm 25 and would normally engage the same. However, the rider 49, carried by the stationary arm 48, is so positioned that engagement of said last-named rider by the projecting edge 46 of the scroll-plate is effected before the edge 43 reaches the stud 36, with the result that the extremity of arm 48 is quickly deflected toward the plate 28, engaging the point of screw 51, and moving said plate 28 to the position shown in Fig. 3. At the same time the wire bow 38 will engage the hook part 41, deflecting the extremity of arm 25 from its normal plane of operation, and bringing the extremity of said arm into frictional engagement with the pad 35 on the rear surface of plate 28, and yielding sufficiently to develop a spring pressure tending to maintain such engagement, as shown in Fig. 6. This action effects the dual purpose of lifting the stud 36 out of the path of the leading edge of the scroll-plate as the same passes the normal point of engagement, and at the same time clamping the arm 25 against further movement in its normal plane of excursion. The angular movement of the plate 28, communicated through the transverse shaft 33 to the arm 56, causes the vane 55 to be quickly withdrawn from the space between the magnet 54 and the switch 52 to a position similar to that shown in Fig. 11, thereby permitting the magnet 54 to act on the armature 65 for causing the switch contacts to be closed. Thus, at the same point in each revolution of the scroll-plate, the circuit controlled by the switch 52 is abruptly closed, initiating an electrical signal or impulse in the circuit 22, and energizing the magnet 68 of the receiving instrument 21.

A short time after the lifting of the rider 49 by the edge 46 of the projecting portion 45 of the scroll-plate 42, and as the part P of the said scroll-plate passes beneath the rider, the latter will slip over the trailing edge 44 and be freed from engagement with the scroll-plate, as seen in Fig. 4. In the meanwhile, however, the edge 43 of the scroll-plate will have passed beneath the stud 36; and, as the stationary arm 48 is released, the plate 28 may follow it only through a very small angle, until the stud 36 rests upon the smooth flat surface of the scroll-plate, as seen in Fig. 7. The pointer-arm 25 remains locked by friction with the pad 35 and, by continued engagement between the hook part 41 and the bridge wire 40, the vane 55 remains substantially as shown in Fig. 11, so that the contacts of the switch continue in their closed position. The lifting of the rider or stud 36 by the engagement of the edge 46 with the inclined face of the rider 49 on the stationary arm 48 eliminates the mechanical jar and side-thrust to which the bearings of the measuring element at the spindle 26 would have been subjected had it been necessary for the lift to have been obtained from interaction between the arcuate edge of the scroll-plate and an inclined rider carried on the arm 25. Moreover, since the initiation of the impulse will always occur at the same instant in the cycle without regard to the position of the pointer 25, it will not be required that the arcuate conformation of the edge 43 have the precision necessary to ensure engagement with the extremity of the pointer-arm 25 at the same instant in the revolution of the scroll-plate for every possible excursion of the pointer. The frictional engagement of the extremity of the arm 25 with the pad 35, coupled with the fact that the smooth face of the scroll-plate is in contact only with the highly polished face 37 of the stud 36, eliminates any tendency for the arm 25 to be dragged along by the scroll-plate, and thus reduces to a minimum any tendency to develop side stresses on the bearings of the measuring element. By the bevelling of the edge 43, the possibility of the stud 36 catching on the same is eliminated; and the arcuate conformation of said edge permits the time lapse between the lifting of the arm 48 by the edge 46 and the passing of the scroll-plate into a position where it may receive and support the stud 36 to be reduced to a minimum. Thus, the time in each cycle during which the arm 48 is in action may be made very short; so that having once accomplished its purpose of lifting the stud 36 over the edge 43 of the scroll-plate and allowing said stud to drop perpendicularly upon the face of the same, the arm 48 becomes inactive for the remainder of the cycle, and further timing is dependent solely upon the arm 25 in relation to the trailing edge of the scroll-plate.

The stud 36 will remain in contact with the scroll-plate as the latter advances in a clockwise sense until its path of travel along the surface of the plate intersects the trailing edge 44. For example, with the arm 25 positioned as shown in Fig. 1, the stud 36 will engage the surface of the scroll-plate at a point M near the leading edge, and will follow the arc M—N, until, as the latter point passes beneath the stud, the same will drop off the scroll-plate. This releases the rocker-plate 28, which, under the pull of the magnet 64 on the vane 55, will immediately move toward the plate 27 with a snap action, until the arm 56 comes to rest on the stop 34. All oscillatable parts are thereby brought to their original relative positions as seen in Figs. 2, 5, 8, and 10, causing the contact established by the switch 52 to be opened and terminating the signal or impulse in the electrical circuit 22, thus de-energizing and releasing the magnet 68 in the receiving instrument. It will further be apparent that as the arm 25 may assume various positions in its plane of excursion in response to variations in the measured magnitude, because of the spiral conformation of the trailing edge 44 of the scroll-plate 42, the length of the arc M—N, representing the time of contact between the rider or stud 36 and the scroll plate will be subject to corresponding variations. Thus, there will be established in the circuit 22 a series of cyclically recurrent electrical signals or impulses having durations representative of the values attained by the measured magnitude during successive cycles of operation of the transmitting instrument 20, and adapted to provide on the chart of the receiving instrument 21 a continuous graphic record of all values attained by said magnitude.

I claim:

1. In an instrument of the nature set forth and including a measuring member and an associated movable element having a smooth surface, together with means for moving said element in cycles past the measuring member, the said element surface having a leading edge and being terminated by an edge making an angle with the direction of travel of the surface, and the measuring member carrying a part adapted to be engaged by said surface and to be released from engagement therewith by its said edge at a time in each of said cycles dependent upon the then excursion of the said movable element, and circuit-controlling means operative in correspondence with the engaging and release of said part with respect to said surface and including a member associated with the movable element: means controlled by the movable element periodically to actuate the said associated member and independently of the excursion of the measuring member and the contour of the leading edge of the movable element.

2. In an instrument of the nature set forth and including a measuring member and an associated movable element having a smooth surface, together with means for moving said element in cycles past the measuring member, the said element surface having a leading edge and being terminated by an edge making an angle with the direction of travel of the surface, and the measuring member carrying a part adapted to be engaged by said surface and to be released from engagement therewith by its said edge at a time in each of said cycles dependent upon the then excursion of the said movable element, and circuit-controlling means operative in correspondence with the engaging and release of said part with respect to said surface and including a member associated with the movable element: means adapted for engaging an edge portion of the movable element projecting in advance of its leading edge and adapted periodically to actuate the said associated member and independently of the excursion of the measuring member and the contour of said leading edge.

3. In an instrument of the nature set forth and including a measuring member and an associated movable element having a smooth surface, together with means for moving said element in cycles past the measuring member, the said element surface having a leading edge and being terminated by an edge making an angle with the direction of travel of the surface, and the measuring member carrying a part adapted to be engaged by said surface and to be released from engagement therewith by its said edge at a time in each of said cycles dependent upon the then excursion of the said movable element, and circuit-controlling means operative in correspondence with the engaging and release of said part with respect to said surface and including a member associated with the movable element: means adapted for engaging an edge portion of the movable element projecting in advance of its leading edge and adapted periodically to actuate the said associated member and independently of the excursion of the measuring member and the contour of said leading edge, together with means movable with the associated member to engage the measuring member and lift thereby its carried part clear of the element surface.

4. In an instrument for transmitting periodic signals of durations representative of successive values of a measured magnitude: the combination with a circuit-controlling device comprising a magnetically actuated contactor, a stationary magnet for energizing the same, a magnetic element in the field of said magnet, subject to the action thereof and adapted for movement into and out of said field to modify its action upon said contactor; of means for effecting one of said movements in opposition to, and the other of said movements in response to, the action of said magnet, and for rendering successive time intervals between alternate movements proportional to said successive values.

5. In an instrument of the nature set forth and including a measuring member and an associated movable element having a smooth surface, together with means for moving said element in cycles past the measuring member, the said element surface having a leading edge and being terminated by an edge making an angle with the direction of travel of the surface, and the measuring member carrying a part adapted to be engaged by said surface and to be released from engagement therewith by its said edge at a time in each of said cycles dependent upon the then excursion of the said movable element, and circuit-controlling means operative in correspondence with the engaging and release of said part with respect to said surface and including a member associated with the movable element: a magnet and a magnetic member within the field of said magnet, the magnetic member being movable with the associated member whereby the latter is biased toward the said element surface, and means to limit the extent of movement of said associated member toward said surface; and means controlled by the movable element periodically to actuate the said associated member and independently of the excursion of the measuring member and the contour of the leading edge of the movable element.

6. In an instrument of the nature set forth and including a measuring member and an associated movable element having a smooth surface, together with means for moving said element in cycles past the measuring member, the said element surface having a leading edge and being terminated by an edge making an angle with the direction of travel of the surface, and the measuring member carrying a part adapted to be engaged by said surface and to be released from engagement therewith by its said edge at a time in each of said cycles dependent upon the then excursion of the said movable element, and circuit-controlling means operative in correspondence with the engaging and release of said part with respect to said surface and including a member associated with the movable element: a magnet and a magnetic member within the field of said magnet, the magnetic member being movable with the associated member whereby the latter is biased toward the said element surface, and means to limit the extent of movement of said associated member toward said surface; means adapted for engaging an edge portion of the movable element projecting in advance of its leading edge and adapted periodically to actuate the said associated member and independently of the excursion of the measuring member and the contour of said leading edge, together with means movable with the associated member to engage the measuring member and lift thereby its carried part clear of the element surface.

7. In an instrument for controlling in an electric circuit periodic signals of durations representative of successive values of a measured magnitude, and having an arm swingable about an axis in a plane perpendicular to said axis and to an extent representative of said magnitude and deflectable through a limited angle perpendicular to said plane: the combination with a plate, and motor means for rotating the same at a uniform velocity about an axis parallel to but displaced from said first-named axis and in a plane parallel to said first-named plane, said plate having a flat surface parallel to said planes and having a leading edge and a spiral trailing edge; of a rocker-plate pivoted for deflection through a limited angle about an axis parallel to said planes, a rider on said swingable arm positioned in the path of said rotatable plate and adapted to be deflected perpendicularly to said planes, to rest on the flat surface of said plate and to be released from engagement with the same by said spiral trailing edge; means subject to actuation by said motor means for periodically deflecting said rocker-plate independently of said rider prior to the time when said rider would have been engaged by the leading edge of said rotatable plate, and for subsequently releasing the same; and means carried by said rocker-plate adapted to engage said swingable arm, said means deflecting the arm and bringing its rider into engagement with said rocker-plate when said plate is deflected, and permitting said rider to engage the flat surface of said rotating plate while maintaining its engagement with said rocker-plate, when the latter is released, together with signal controlling means in said circuit and subject to actuation by movements of said rocker-plate.

8. In an instrument for controlling in an electric circuit periodic signals of durations representative of successive values of a measured magnitude, and having an arm swingable about an axis in a plane perpendicular to said axis and to an extent representative of said magnitude and deflectable through a limited angle perpendicular to said plane: the combination with a plate, and motor means for rotating the same at a uniform velocity about an axis parallel to but displaced from said first-named axis and in a plane parallel to said first-named plane, said plate having a flat surface parallel to said planes and having a leading edge and a spiral trailing edge; of a rocker-plate pivoted for deflection through a limited angle about an axis parallel to said planes, a rider on said swingable arm positioned in the path of said rotatable plate and adapted to be deflected perpendicularly to said planes, to rest on the flat surface of said plate and to be released from engagement with the same by said spiral trailing edge; a resilient stationary arm yieldable in a direction normal to its length, a follower element carried by the same and subject to deflection by a portion of said rotating plate; and means carried by said rocker-plate adapted to engage said swingable arm, said means deflecting the arm and bringing its rider into engagement with said rocker-plate when said plate is deflected, and permitting said rider to engage the flat surface of said rotating plate while maintaining its engagement with said rocker-plate, when the latter is released, together with signal controlling means in said circuit and subject to actuation by movements of said rocker-plate.

9. In an instrument for controlling in an electric circuit periodic signals of durations representative of successive values of a measured magnitude, and having an arm swingable about an axis in a plane perpendicular to said axis and to an extent representative of said magnitude and deflectable through a limited angle perpendicular to said plane: the combination with a plate, and motor means for rotating the same at a uniform velocity about an axis parallel to but displaced from said first-named axis and in a plane parallel to said first-named plane, said plate having a flat surface parallel to said planes and having a leading edge and a spiral trailing edge; of a rocker-plate pivoted for deflection through a limited angle about an axis parallel to said planes, a rider on said swingable arm positioned in the path of said rotatable plate and adapted to be deflected perpendicularly to said planes, to rest on the flat surface of said plate and to be released from engagement with the same by said spiral trailing edge; means subject to actuation by said motor means for periodically deflecting said rocker-plate independently of said rider prior to the time when said rider would have been engaged by the leading edge of said rotatable plate, and for subsequently releasing the same; a resilient member carried by said rocker-plate adapted to engage said swingable arm, said means deflecting the arm and bringing its rider into engagement with said rocker-plate when said plate is deflected, and permitting said rider to engage the flat surface of said rotating plate while maintaining its engagement with said rocker-plate, when the latter is released, together with signal controlling means in said circuit and subject to actuation by movements of said rocker-plate.

FRANKLIN B. BRISTOL.